(12) United States Patent
Kimura et al.

(10) Patent No.: US 11,670,330 B2
(45) Date of Patent: Jun. 6, 2023

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Naoki Kimura, Tokyo (JP); Fumiya Kudo, Kamakura Kanagawa (JP); Takao Abe, MuYokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/472,049

(22) Filed: Sep. 10, 2021

(65) Prior Publication Data

US 2022/0301586 A1 Sep. 22, 2022

(30) Foreign Application Priority Data

Mar. 17, 2021 (JP) .............................. JP2021-044093

(51) Int. Cl.
*G11B 20/12* (2006.01)
*G11B 5/00* (2006.01)
*G11B 5/596* (2006.01)
*G11B 5/012* (2006.01)
*G11B 5/55* (2006.01)

(52) U.S. Cl.
CPC .......... *G11B 5/59655* (2013.01); *G11B 5/012* (2013.01); *G11B 5/5547* (2013.01)

(58) Field of Classification Search
CPC ... G11B 5/54; G11B 5/59633; G11B 5/59638; G11B 5/56; G11B 5/58; G11B 15/005; G11B 20/12; G11B 20/18; G11B 5/00; G11B 20/14; G11B 20/16
USPC ...... 360/75, 77.04, 77.02, 53, 77.01, 48, 40, 360/49
See application file for complete search history.

(56) References Cited

U.S. PATENT DOCUMENTS

| | | | |
|---|---|---|---|
| 6,493,173 B1 | 12/2002 | Kim et al. | |
| 7,365,927 B2 | 4/2008 | Takamatsu et al. | |
| 10,163,458 B2 | 12/2018 | Hara | |
| 11,087,796 B2* | 8/2021 | Tagami | G11B 5/59633 |
| 2007/0058277 A1* | 3/2007 | Kudo | G11B 5/59633 360/77.02 |

\* cited by examiner

*Primary Examiner* — Nabil Z Hindi
(74) *Attorney, Agent, or Firm* — Allen & Overy LLP

(57) ABSTRACT

According to one embodiment, a first storage area and a second storage area in which a plurality of tracks are set are provided in a radial direction of a magnetic disk. A plurality of post codes corresponding to the second storage area is stored in the first storage area. A controller controls first processing of reading a plurality of post codes from the first storage area and writing the plurality of read post codes in servo area of the second storage area. In the first processing, the controller controls both second processing and third processing in a state where a write head is located on a first track. The second processing is processing of writing a post code among the plurality of read post codes in a servo area. The third processing is processing of writing user data in a data area or reading user data from a data area.

20 Claims, 13 Drawing Sheets

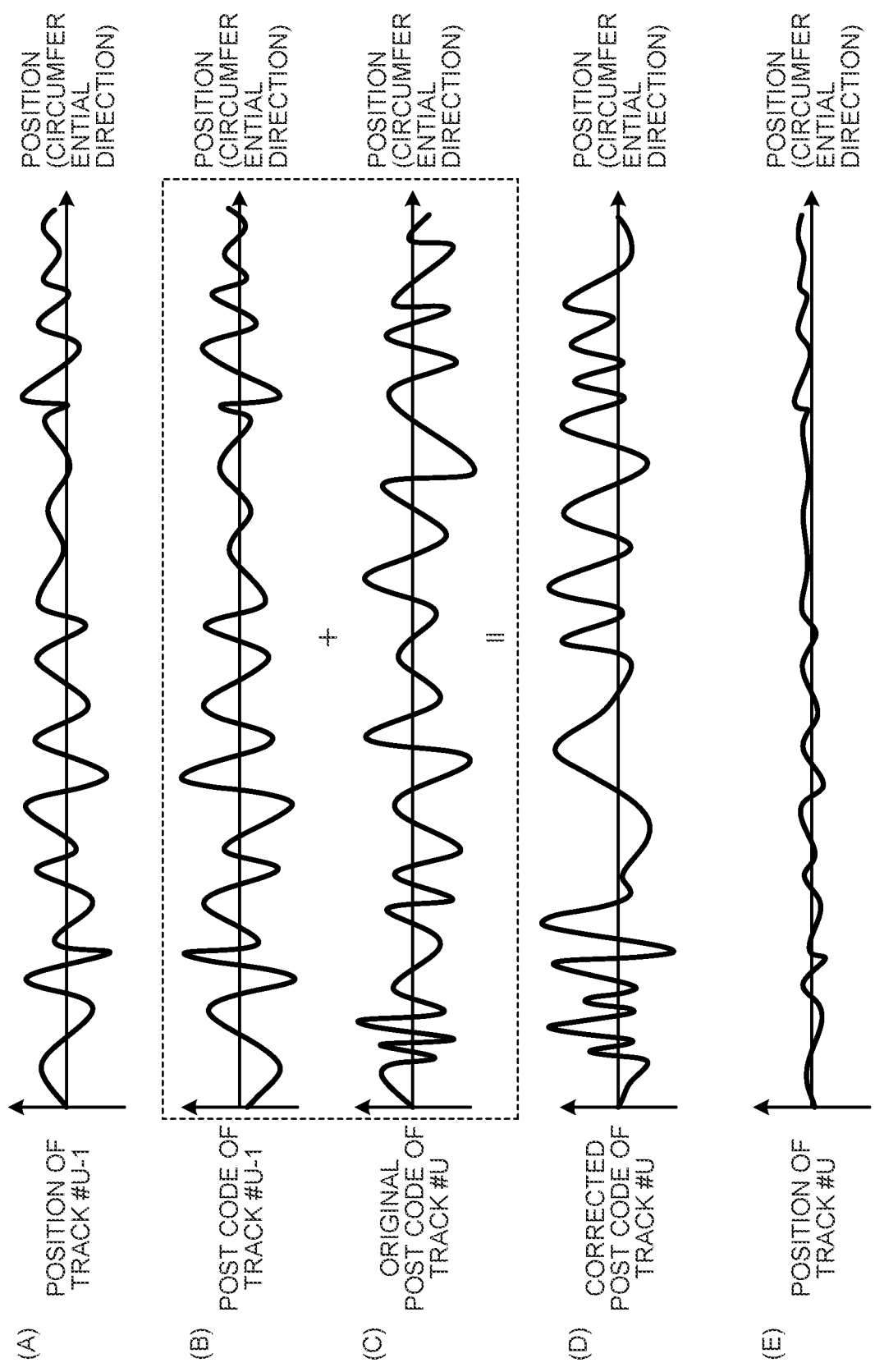

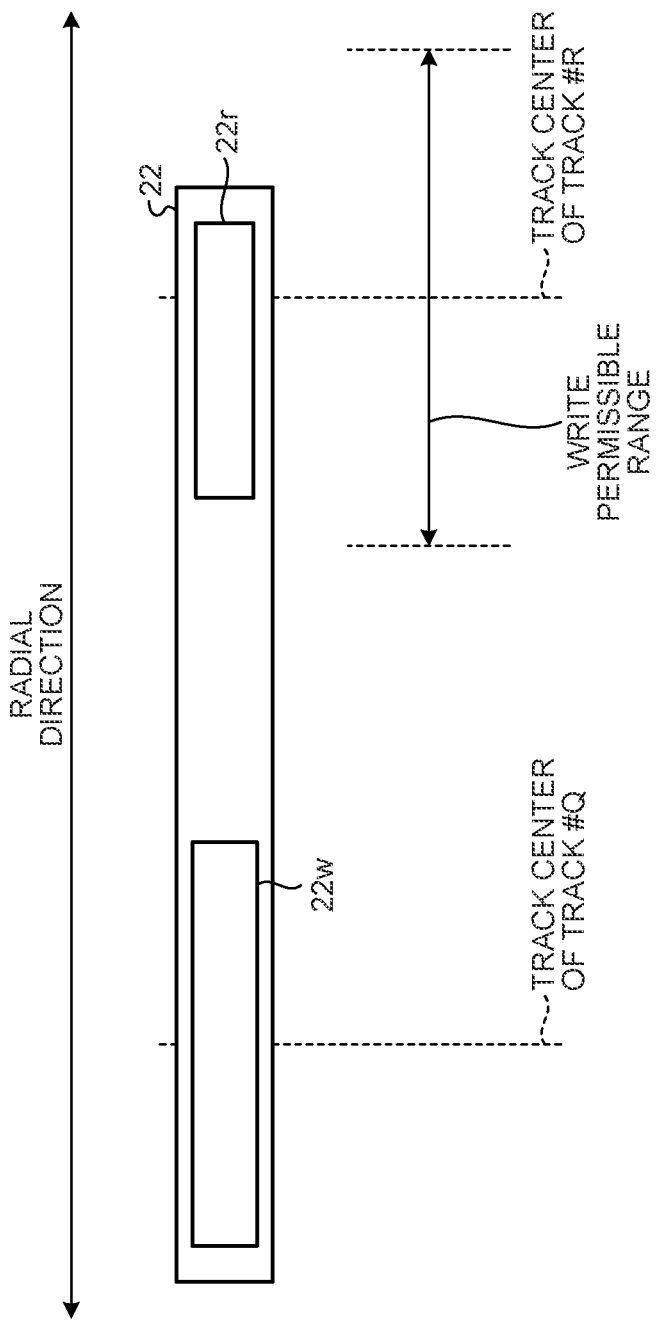

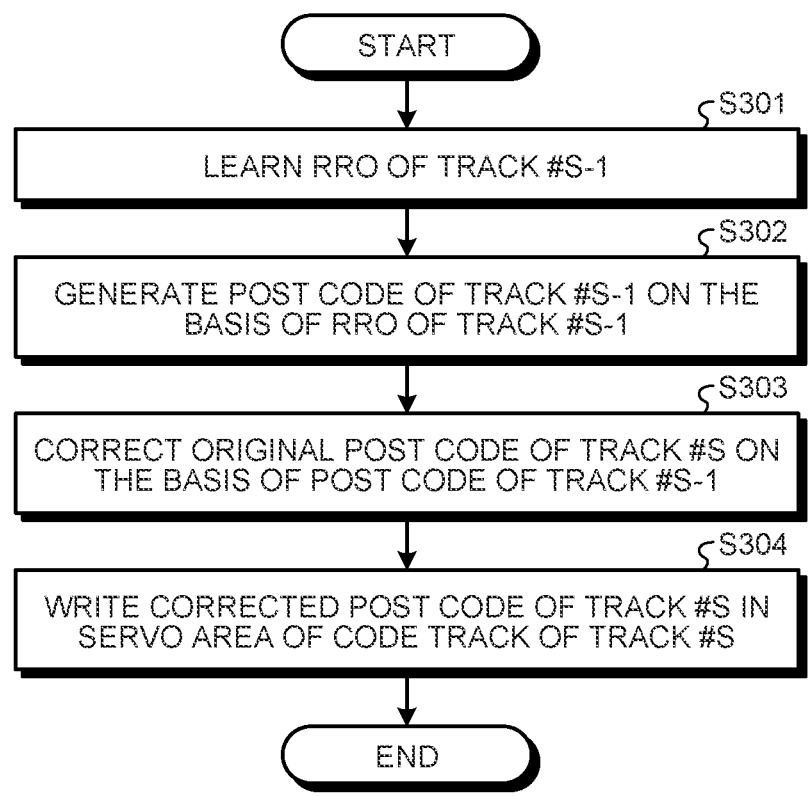

MAGNETIC DISK DEVICE AND METHOD

CROSS-REFERENCE TO RELATED APPLICATIONS

This application is based upon and claims the benefit of priority from Japanese Patent Application No. 2021-044093, filed on Mar. 17, 2021; the entire contents of which are incorporated herein by reference.

FIELD

Embodiments described herein relate generally to a magnetic disk device and method.

BACKGROUND

In related art, a scheme of writing a post code on each track has been employed in a magnetic disk device. The post code is data for correcting a repeatable runout (RRO) of each track. The RRO is an element which is in synchronization with rotation of a magnetic disk among an amount of positional displacement from an ideal shape (an exact circle in an example) in a radial direction of a track. The post code is also referred to as an RRO bit.

BRIEF DESCRIPTION OF THE DRAWINGS

FIG. 12 is a schematic diagram for explaining processing of correction of a post code in a third embodiment;

FIG. 13 is a view for explaining a condition for executing learning of an RRO in parallel to writing at a magnetic disk device in the third embodiment; and FIG. 14 is a flowchart illustrating an example of operation of the magnetic disk device in the third embodiment.

DETAILED DESCRIPTION

Figure 1:
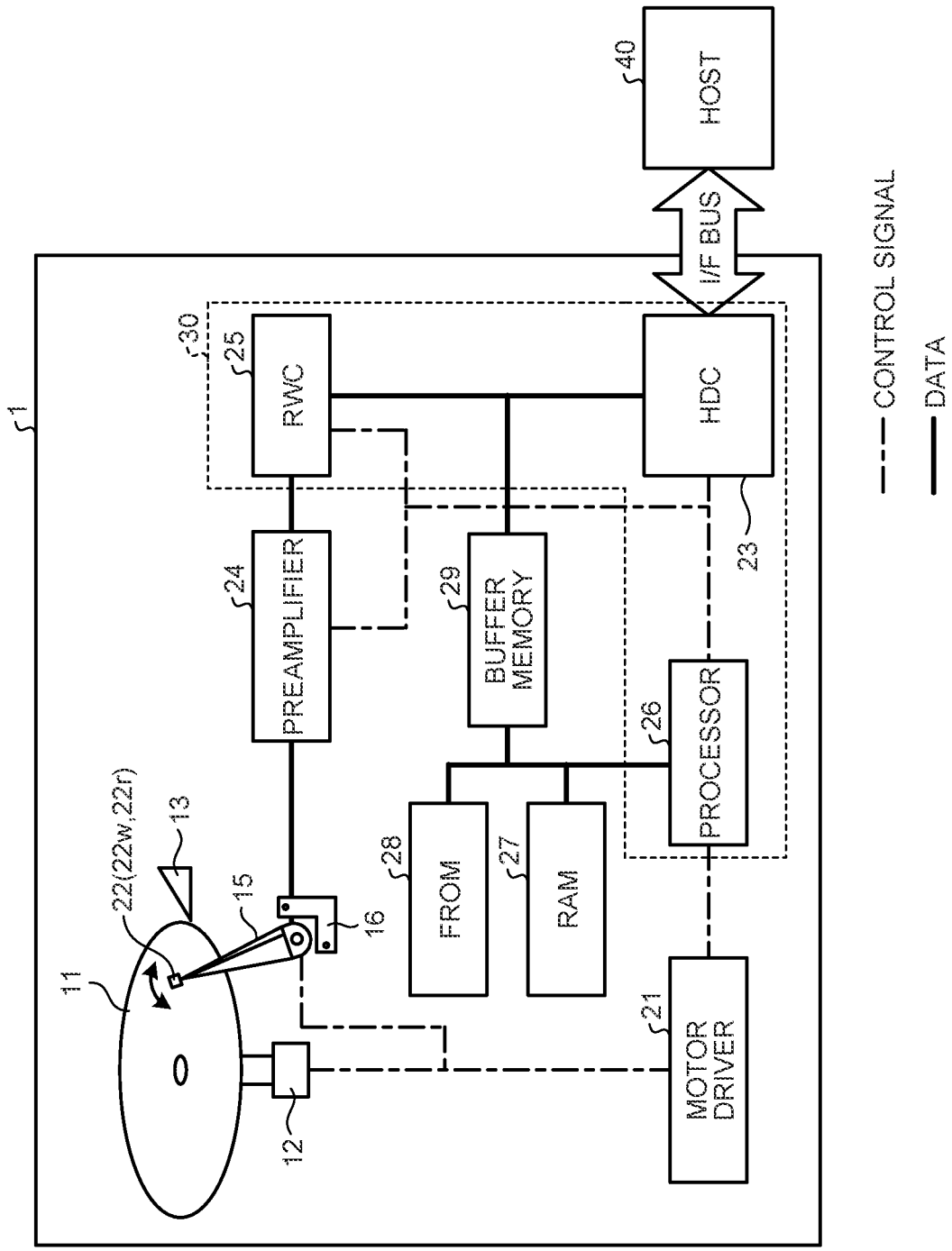
FIG. 1 is a view illustrating an example of a configuration of a magnetic disk device in a first embodiment.

According to the present embodiment, a magnetic disk device includes a magnetic disk, a magnetic head, and a controller. A first storage area and a second storage area in which a plurality of tracks are set are provided in a radial direction of the magnetic disk. In the first storage area, a plurality of post codes for correcting positional displacement of a plurality of tracks is stored. A third storage area and a fourth storage area are provided in a circumferential direction of the second storage area. The magnetic head includes a write head which executes writing on the magnetic disk, and a read head which executes reading from the magnetic disk. The controller executes control of executing first processing of reading a plurality of post codes from the first storage area and writing the plurality of read post codes in the third storage area of the second storage area. In the first processing, the controller executes control of executing both second processing and third processing in a state where the write head is located on a first track among the plurality of tracks. The second processing is processing of writing a first post code among the plurality of read post codes in the third storage area. The third processing is processing of writing user data in the fourth storage area or reading user data from the fourth storage area.

The magnetic disk device and method according to embodiments will be described in detail below with reference to the accompanying drawings. Note that the present invention is not limited to these embodiments.

First Embodiment

The magnetic disk device includes a magnetic disk and a magnetic head. A plurality of tracks is arranged in a radial direction on the magnetic disk, and user data is written along each track. A servo area and a data area are provided in a circumferential direction of the magnetic disk, and the user data is written in the data area on each track. Information to be used for positioning the magnetic head is written in the servo area. The information to be written in the servo area includes a post code.

A plurality of schemes is known as a scheme for arranging a plurality of tracks. The plurality of schemes includes a scheme referred to as conventional magnetic recording (CMR) and a scheme referred to as shingled magnetic recording (SMR). Hereinafter, the scheme for arranging a plurality of tracks will be expressed as a track arrangement scheme. Note that the track arrangement scheme is not limited to the CMR and the SMR.

The magnetic disk device can switch, during operation of the magnetic disk device, the track arrangement scheme to be used in a certain storage area on the magnetic disk. Here, as an example, the magnetic disk device can switch, among the CMR and the SMR, the track arrangement scheme to be used.

In a case where the track arrangement scheme in a certain storage area (expressed as a target storage area) is switched from one scheme to the other scheme (expressed as a new scheme), positions of a plurality of tracks within the target storage area change, and thus, it is necessary to overwrite a set of post codes which have already been written in the target storage area with a set of post codes which correspond to the track arrangement scheme of a switching destination. The track arrangement scheme of the switching destination is the new scheme. Further, it is necessary to format the target storage area. The formatting refers to writing of user data. The user data to be written in formatting is user data stored in the target storage area before the track arrangement scheme is switched. The user data to be written in formatting may be all 1 or all 0.

In the first embodiment, the magnetic disk device sequentially positions the magnetic head on each of a plurality of tracks set in the target storage area, that is, a plurality of tracks arranged in accordance with the track arrangement scheme of the switching destination. After the magnetic disk device positions the magnetic head on one track, the magnetic disk device executes both writing of the post code in the servo area and writing of user data in the data area before moving the magnetic head on the next track.

Note that in the present specification, positioning the magnetic head on a track will be referred to as control of maintaining the magnetic head on the track. Such control will be referred to as tracking control. In contrast, control of moving the magnetic head to a target track from a position different from the target track will be referred to as seek control.

In other words, in the first embodiment, the magnetic disk device performs seek control of moving the magnetic head to a certain track. Then, the magnetic disk device performs both writing of the post code and writing of the user data in a state where the magnetic disk device performs tracking control of maintaining the magnetic head on the certain track. After writing of the post code and writing of the user data in the certain track are completed, the magnetic disk device executes seek control of moving the magnetic head to the next track and performs both writing of the post code and writing of the user data while executing tracking control of maintaining the magnetic head on the next track.

Technologies which may be compared with the first embodiment may include a technology of executing writing of post codes in all tracks within a target storage area and then executing writing of user data in all tracks within the target storage area. This technology will be expressed as a technology according to a comparative example. According to the technology according to the comparative example, it is necessary to perform seek control of the magnetic head respectively upon writing of the post code and upon writing of the user data. In other words, it is necessary to perform seek control twice on each track within the target storage area.

In contrast, according to the first embodiment, both writing of the post code and writing of the user data are executed in a state where tracking control of maintaining a position of the magnetic head on one track is executed. Thus, seek control is executed once on each track within the target storage area. In other words, according to the first embodiment, it is possible to reduce the number of times of execution of seek control compared to the technology according to the comparative example. This shortens a time period required for processing of writing post codes and writing of user data compared to the technology according to the comparative example. In other words, efficiency of processing regarding writing of post codes is improved.

The first embodiment and respective track arrangement schemes will be described in detail below.

FIG. 1 is a view illustrating an example of a configuration of a magnetic disk device 1 in the first embodiment.

The magnetic disk device 1 is connected to a host 40. The magnetic disk device 1 can receive an access command such as a write command and a read command from the host 40. Further, the magnetic disk device 1 can receive a command which requests switching of the track arrangement scheme in addition to the access command.

The magnetic disk device 1 includes a magnetic disk 11. The magnetic disk device 1 writes data in the magnetic disk 11 or reads data from the magnetic disk 11 in accordance with the access command.

Data is written or read through a magnetic head 22. Specifically, the magnetic disk device 1 includes a spindle motor 12, a ramp 13, an actuator arm 15, a voice coil motor (VCM) 16, a motor driver 21, the magnetic head 22, a hard disk controller (HDC) 23, a preamplifier 24, a read write channel (RWC) 25, a processor 26, a random access memory (RAM) 27, a flash read only memory (FROM) 28, and a buffer memory 29 in addition to the magnetic disk 11.

The magnetic disk 11 is rotated around a rotational axis at predetermined rotation speed by the spindle motor 12. Rotation of the spindle motor 12 is driven by the motor driver 21.

The magnetic head 22 executes access to the magnetic disk 11 using a write head $22w$ and a read head $22r$ of the magnetic head 22. The write head $22w$ executes writing to the magnetic disk 11. The read head $22r$ executes reading from the magnetic disk 11. The magnetic head 22 is attached to a tip of the actuator arm 15. The magnetic head 22 is moved in a radial direction of the magnetic disk 11 by the VCM 16 driven by the motor driver 21. The magnetic head 22 is moved on the ramp 13 while the magnetic disk 11 stops rotation, or the like.

The preamplifier 24 amplifies a signal read from the magnetic disk 11 and outputs and supplies the amplified signal to the RWC 25 upon reading of data from the magnetic disk 11. Further, the preamplifier 24 amplifies a signal corresponding to data to be written supplied from the RWC 25 and supplies the amplified signal to the magnetic head 22.

The HDC 23 performs control of transmission/reception of data performed to/from the host 40 via an I/F bus, control of the buffer memory 29, error correction processing of the read data, or the like.

The buffer memory 29 is used as a buffer of data to be transmitted/received to/from the host 40. For example, the buffer memory 29 is used to temporarily store data to be written in the magnetic disk 11.

The buffer memory 29 is constituted with, for example, a volatile memory which can perform high-speed operation. A type of a memory which constitutes the buffer memory 29 is not limited to a specific type. The buffer memory 29 can be constituted with, for example, a dynamic random access memory (DRAM), a static random access memory (SRAM) or combination thereof.

The RWC 25 performs code modulation on data to be written supplied from the HDC 23 and supplies the code-modulated data to the preamplifier 24. Further, the RWC 25 performs code demodulation on a signal which is read from the magnetic disk 11 and supplied from the preamplifier 24 and outputs the code-demodulated signal to the HDC 23 as digital data.

The processor 26 is, for example, a central processing unit (CPU). The RAM 27, the flash read only memory (FROM) 28, and the buffer memory 29 are connected to the processor 26.

The RAM 27 is constituted with, for example, a DRAM, an SRAM or combination thereof. The RAM 27 is used as a memory for operation by the processor 26. The RAM 27 is used as an area to which a firmware program is to be loaded, or an area in which various kinds of management data are to be stored.

The FROM 28 is a non-volatile memory. The processor 26 performs overall control of the magnetic disk device 1 in accordance with a firmware program stored in the FROM 28 and the magnetic disk 11 in advance. For example, the processor 26 loads the firmware program stored in the FROM 28 and the magnetic disk 11 in advance to the RAM 27 and executes control of the motor driver 21, the preamplifier 24, the RWC 25, the HDC 23, or the like, in accordance with the loaded firmware program.

Note that the configuration including the HDC 23, the RWC 25 and the processor 26 may be regarded as the controller 30. The controller 30 may include other components such as the RAM 27, the FROM 28 and the buffer memory 29.

Figure 2:
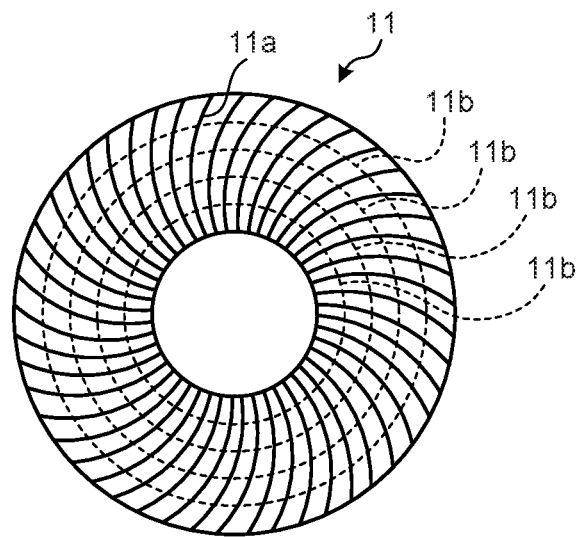
FIG. 2 is a view illustrating an example of the configuration of a magnetic disk in the first embodiment.

FIG. 2 is a view illustrating an example of a configuration of the magnetic disk 11 in the first embodiment. For example, servo information is written in a magnetic layer formed on a surface of the magnetic disk 11 by a servo writer, or the like, before shipment. The servo information includes sector/cylinder information and a burst pattern. The sector/cylinder information provides servo address in the circumferential direction and in the radial direction of the magnetic disk 11. The sector/cylinder information is used for seek control of moving the magnetic head 22 to a target track. The burst pattern is used for tracking control of maintaining the magnetic head 22 on a target track. Note that the servo information may be written in the magnetic disk 11 after shipment by a self-servo write (SSW). FIG. 2 illustrates the servo areas 11a arranged in a radial manner as an example of arrangement of the servo areas in which the servo information is written. A plurality of concentric tracks (for example, tracks 11b in FIG. 2) is set in the radial direction of the magnetic disk 11.

Note that post codes are also written in the servo areas 11a in addition to the above-described servo information. The post codes to be written in the servo areas 11a will be described later.

In the first embodiment, the SMR and the CMR are employed as examples of a plurality of track arrangement schemes. The magnetic disk device 1 can switch the track arrangement scheme in a storage area of the magnetic disk 11 between the SMR and the CMR. The SMR and the CMR will be described with reference to FIG. 3 and FIG. 4.

Figure 3:
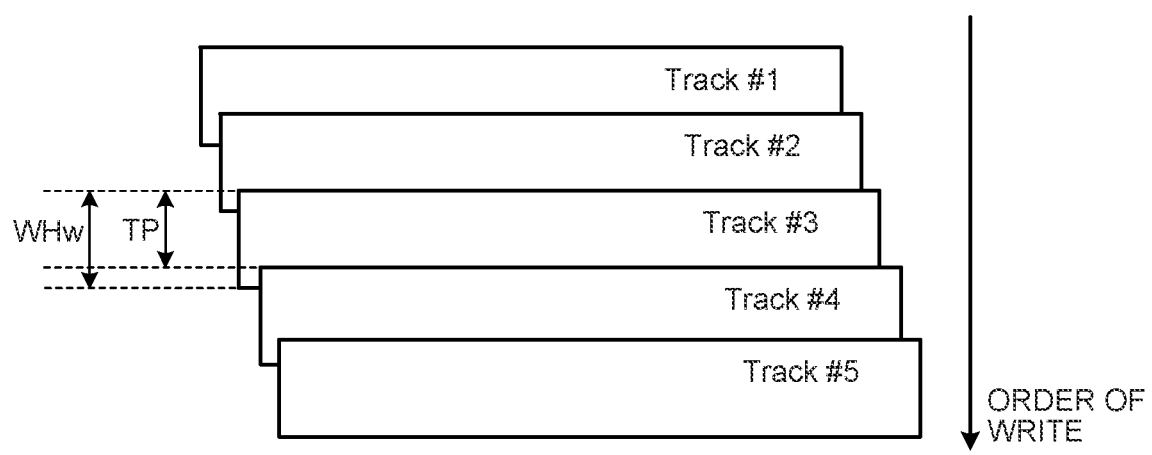
FIG. 3 is a schematic diagram for explaining an SMR in a track arrangement method to be used at the magnetic disk device in the first embodiment.

FIG. 3 is a schematic diagram for explaining the SMR in a track arrangement method to be used at the magnetic disk device 1 in the first embodiment. The SMR is a scheme in which respective tracks are arranged so that data of a certain track (expressed as first data) overlaps with data of a track adjacent to the track in the radial direction (expressed as second data) in a case where writing of the first data is executed, and then, writing of the second data is executed. In other words, according to the SMR, data of one track out of two tracks which are adjacent to each other in the radial direction of the magnetic disk 11 is written while the data overlaps with part of data of the other track out of the two tracks.

For example, part of data of a track #2 overlaps with data of a track #1. Further, part of data of a track #3 overlaps with data of a track #2. In other words, according to the SMR, data of one track sequentially overlaps with part of data of an adjacent track in which data has already been written.

This makes a width of each track, in other words, a track pitch TP is narrowed than a width (WHw) of the write head 22w of the magnetic head 22. As a result, recording density is improved. In other words, according to the SMR, storage capacity can be increased compared to the CMR which will be described later.

However, according to the SMR, the track pitch TP is narrower than the width WHw of the write head 22w, and thus, if part of data corresponding to a plurality of tracks is updated, data of a track adjacent to the updated data is corrupted. To prevent corruption of data, according to the SMR, data corresponding to a plurality of tracks including the part of data is collectively updated. An area of the plurality of tracks which is collectively updated can be referred to as a zone, a band, or the like. The SMR in which the updating method as described above is performed, has lower random access performance than random access performance of the CMR which will be described later.

Figure 4:
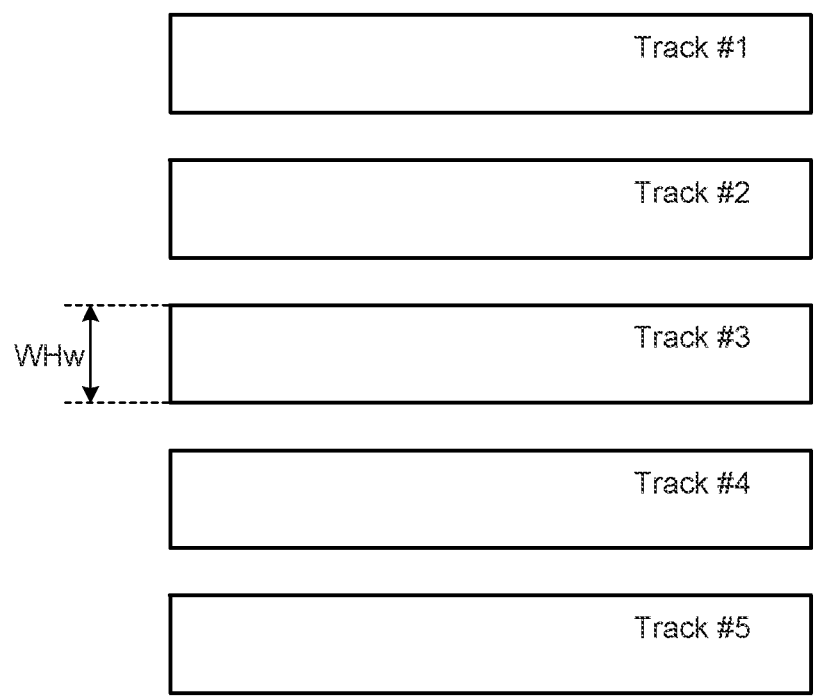
FIG. 4 is a schematic diagram for explaining the CMR in the track arrangement method to be used at the magnetic disk device in the first embodiment.

FIG. 4 is a schematic diagram for explaining the CMR in the track arrangement method to be used at the magnetic disk device 1 in the first embodiment. As illustrated in FIG. 4, according to the CMR, respective tracks are arranged so that a track does not overlap with a track adjacent in the radial direction. In other words, the CMR is a scheme in which data is written so that data in two tracks adjacent to each other in the radial direction of the magnetic disk 11 does not overlap with each other. According to the CMR, a width of each track is the same as the width (WHw) of the write head 22w, and thus, data at an arbitrary position can be updated. Thus, the CMR achieves higher random access performance than the SMR although the CMR has smaller storage capacity than the storage capacity of the SMR.

Figure 5:
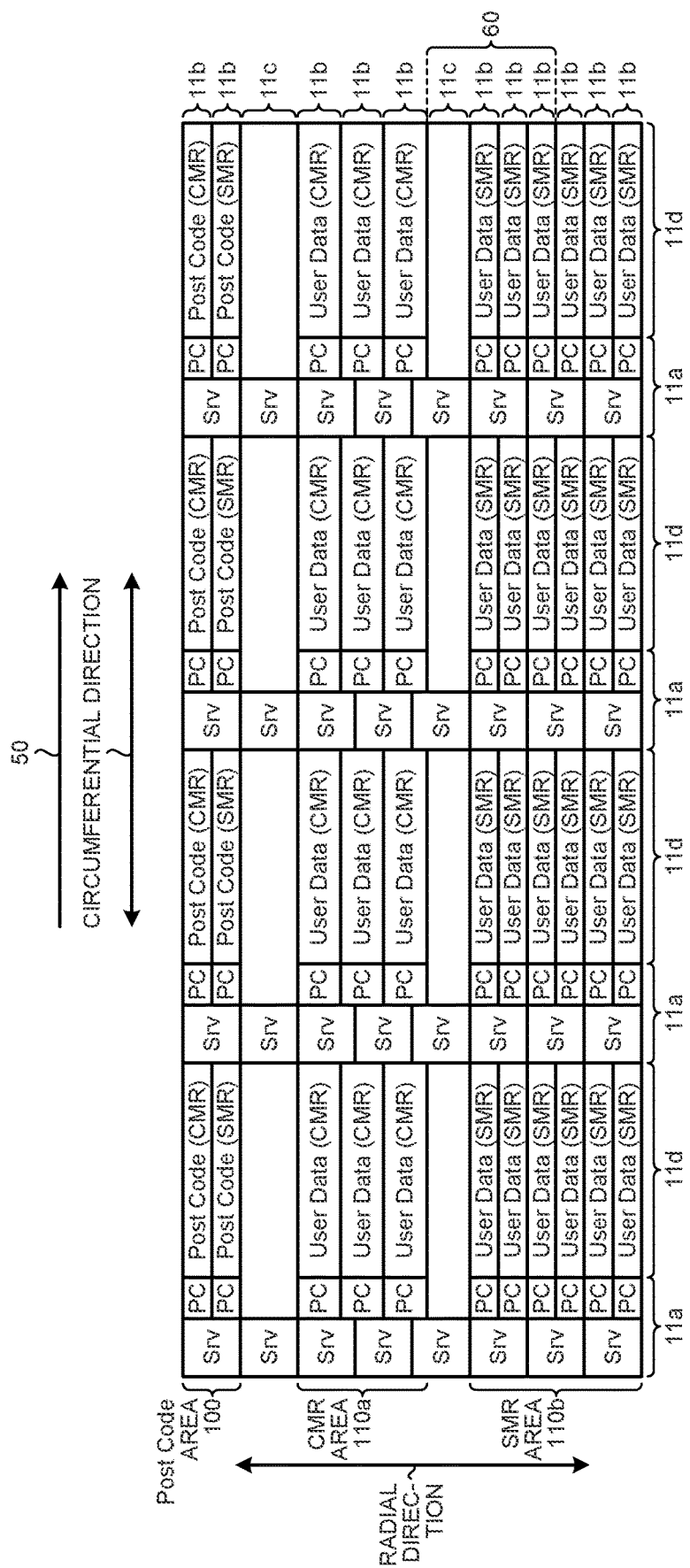
FIG. 5 is a schematic diagram for explaining an example of setting of a track arrangement scheme at a certain timing in the first embodiment.

FIG. 5 is a schematic diagram for explaining an example of setting of the track arrangement scheme at a certain timing in the first embodiment. Note that it is assumed in FIG. 5 that the magnetic head 22 relatively moves with respect to the magnetic disk 11 in a direction indicated with an arrow 50. Further, while it is assumed in FIG. 5 that four servo areas 11a are included in the circumferential direction, the number of servo areas 11a included in the circumferential direction is not limited to four.

As illustrated in FIG. 5, a post code area 100, a CMR area 110a, and an SMR area 110b are arranged in the radial direction in the magnetic disk 11. The respective areas 100, 110a, and 110b are constituted with a plurality of tracks 11b. Guard areas 11c are provided at boundaries of the respective areas 100, 110a, and 110b. The guard areas 11c are areas in which data is not written.

Note that two or more CMR areas 110a can be allocated to the magnetic disk 11. Further, two or more SMR areas 110b can be allocated to the magnetic disk 11.

A plurality of tracks 11b is arranged in the CMR area 110a using a scheme of the CMR. A plurality of tracks 11b is arranged in the SMR area 110b using a scheme of the SMR.

A post code (PC) is written in each servo area 11a of each track 11b. Further, servo information (Srv) is written in each servo area 11a. The controller 30 corrects an amount of positional displacement of each track 11b on the basis of the post code written in each servo area 11a.

Further, data areas 11d are provided between the servo areas 11a on each track 11b. The data areas 11d are areas in which the user data can be written. The user data is written in the data areas 11d of the CMR area 110a and the SMR area 110b.

A set of post codes for CMR and a set of post codes for SMR corresponding to all areas in which at least tracks 11b of the magnetic disk 11 can be set are stored in the data areas 11d of the post code area 100.

Figure 6:
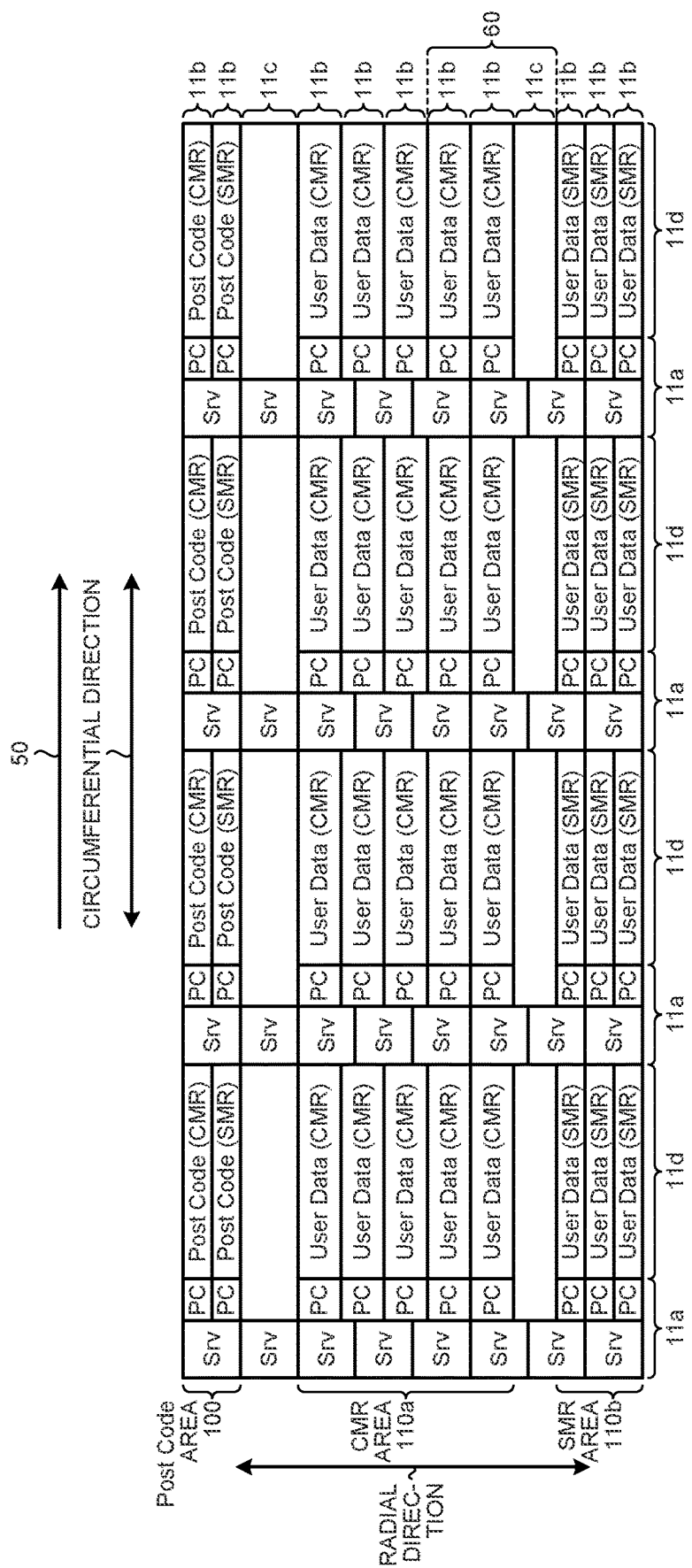
FIG. 6 is a schematic diagram for explaining an example of setting of the track arrangement scheme at a timing different from the timing in FIG. 5 in the first embodiment.

FIG. 6 is a schematic diagram for explaining an example of setting of the track arrangement scheme at a timing different from the timing in FIG. 5 in the first embodiment. More specifically, FIG. 6 illustrates setting of the track arrangement scheme after the track arrangement scheme of a range 60 is switched from the SMR to the CMR from a state illustrated in FIG. 5.

In the example illustrated in FIG. 5, three tracks 11b which are arranged in accordance with the SMR are provided in the range 60. In the example illustrated in FIG. 6, two tracks 11b which are arranged in accordance with the CMR are provided in the range 60.

Arrangement of the respective tracks 11b within the range 60 is changed by switching of the track arrangement scheme in the range 60, and thus, the controller 30 replaces post codes within the servo areas 11a in the range 60 in accordance with switching of the track arrangement scheme. More specifically, the controller 30 overwrites post codes for the track arrangement scheme of the switching destination, that is, the CMR in the servo areas 11a in the range 60. This enables the controller 30 to correct an amount of positional displacement of the two tracks 11b in the range 60 after the track arrangement scheme in the range 60 is switched from the SMR to the CMR.

It takes a lot of time to generate post codes. Thus, in the first embodiment, the controller 30 acquires post codes for CMR to be used in overwriting from the post code area 100. This eliminates necessity of generating post codes in accordance with switching of the track arrangement scheme, which results in achieving reduction in a time period required for switching the track arrangement scheme.

Note that the magnetic disk device 1 can also switch the track arrangement scheme from the CMR to the SMR. For example, in a case where the track arrangement scheme in the range 60 is switched from the CMR to the SMR from the state illustrated in FIG. 6, the track arrangement scheme becomes the state illustrated in FIG. 5. In a case where the track arrangement scheme in the range 60 is switched from the CMR to the SMR, the controller 30 reads post codes for SMR corresponding to the range 60 from the post code area 100 and overwrites the read post codes for SMR corresponding to the range 60 in the servo areas 11a in the range 60. This enables the controller 30 to correct an amount of positional displacement of the three tracks 11b in the range 60 after the track arrangement scheme in the range 60 is switched from the CMR to the SMR.

Hereinafter, the storage area like the range 60 which is set as a target for which the track arrangement scheme is to be switched will be expressed as a target storage area. Note that a case has been described in FIG. 5 and FIG. 6 where no limitation is set on a selection method of the target storage area. Limitations may be set on the selection method of the target storage area. For example, the target storage area may be selected in unit of an area sectioned by the guard areas 11c. Further, the target storage area may be selected in unit of a zone, a band, or the like.

As described above, the post code area 100 in which a set of post codes for CMR and a set of post codes for SMR are stored is provided in a predetermined range in the radial direction of the magnetic disk 11. An arrangement of the post code area 100 is not limited to a specific arrangement. As an example, the post code area 100 can be provided at a central portion in the radial direction of the magnetic disk 11.

In the examples illustrated in FIG. 5 and FIG. 6, the post code area 100 is an example of a first storage area. The CMR area 110a and the SMR area 110b are an example of a second storage area. In other words, the first storage area and the second storage area are provided in the radial direction of the magnetic disk 11.

Further, in the examples illustrated in FIG. 5 and FIG. 6, the servo area 11a is an example of a third storage area. The data area 11d is an example of a fourth storage area. In other words, the third storage area and the fourth storage area are provided in the circumferential direction of the magnetic disk 11.

Subsequently, positional relationship between the read head 22r and the write head 22w in the radial direction of the magnetic disk 11 will be described. In the present specification, a position in the radial direction of the magnetic disk 11 will be expressed as a radial position.

The read head 22r and the write head 22w are actually provided separately from each other at the magnetic head 22. Thus, a radial position of the read head 22r is not always equal to a radial position of the write head 22w. Further, positional relationship between the radial position of the read head 22r and the radial position of the write head 22w differs in accordance with a position of the magnetic head 22.

Figure 7:
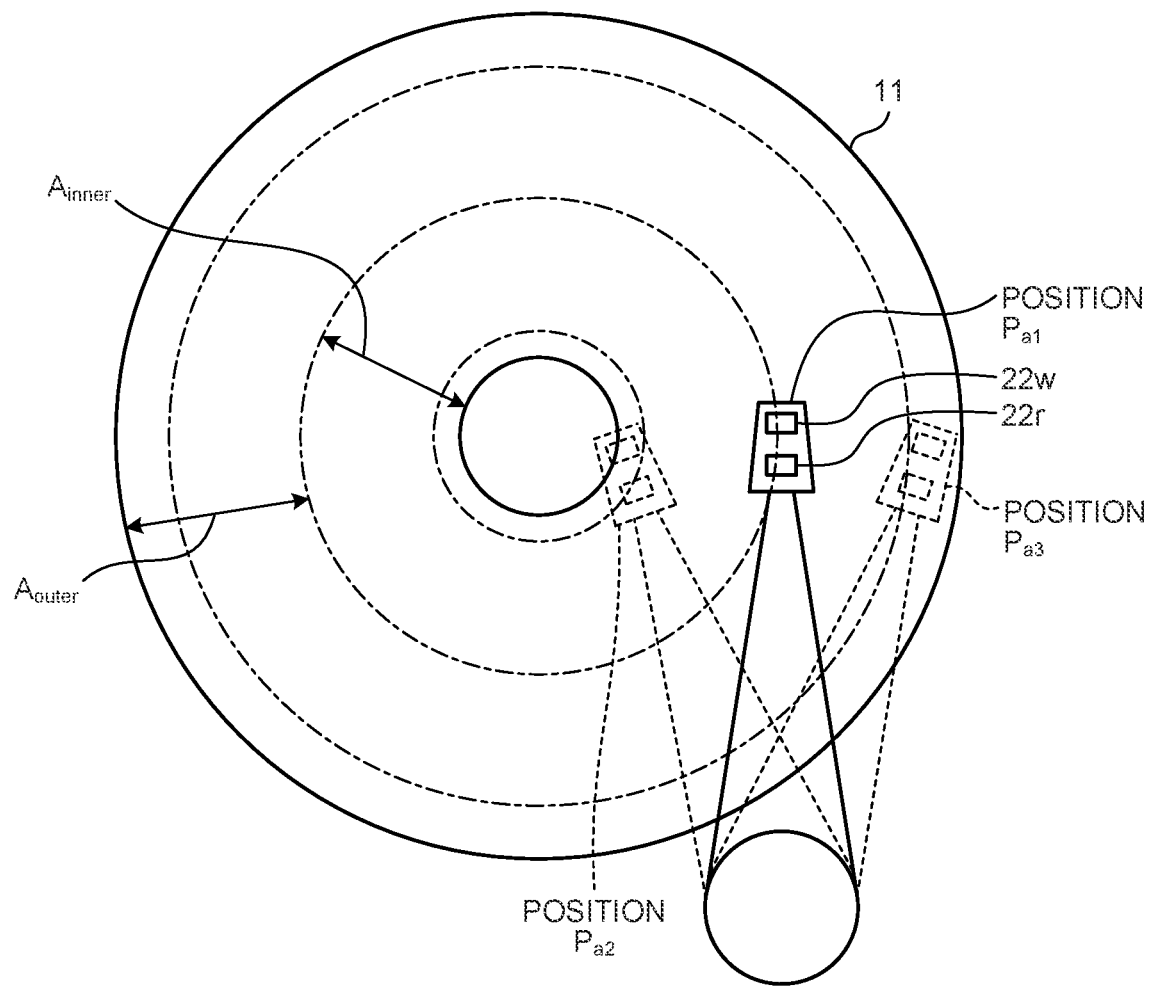
FIG. 7 is a schematic diagram for explaining an example of positional relationship between a radial position of a read head and a radial position of a write head at the magnetic disk device in the first embodiment.

FIG. 7 is a schematic diagram for explaining an example of positional relationship between a radial position of a read head 22r and a radial position of a write head 22w at the magnetic disk device 1 in the first embodiment.

In the example illustrated in FIG. 7, the read head 22r and the write head 22w are arranged in a direction in which the actuator arm 15 extends. Then, the read head 22r is arranged on a side closer to a rotational axis of the actuator arm 15 than the write head 22w.

For example, a direction in which the write head 22w and the read head 22r are arranged is orthogonal to the radial direction at a position $P_{a1}$. In such a case, the radial position of the read head 22r becomes equal to the radial position of the write head 22w.

In a case where the magnetic head 22 is located in an area $A_{inner}$ on an inner periphery side from the position $P_{a1}$, for example, in a case where the magnetic head 22 is located at a position $P_{a2}$, the write head 22w is located on an inner periphery side from the read head 22r. In other words, the radial position of the write head 22w is separate from the radial position of the read head 22r on the inner periphery side. A distance between the radial position of the write head 22w and the radial position of the read head 22r becomes greater as the position of the magnetic head 22 moves away from the position $P_{a3}$, on the inner periphery side.

In a case where the magnetic head 22 is located in an area $A_{outer}$ on an outer periphery side from the position $P_{a1}$, for example, in a case where the magnetic head 22 is located at a position $P_{a3}$, the write head 22w is located on an outer periphery side of the magnetic disk 11 from the read head 22r. In other words, the radial position of the write head 22w is separate from the radial position of the read head 22r on the outer periphery side. A distance between the radial position of the write head 22w and the radial position of the read head 22r becomes greater as the position of the magnetic head 22 moves away from the position $P_{a1}$ on the outer periphery side.

In this manner, in a case where the radial position of the magnetic head 22 is different from the position $P_{a1}$, the radial position of the write head 22w is separate from the radial position of the read head 22r. In other words, the write head 22w and the read head 22r are located on different tracks 11b.

Thus, the controller 30 writes a post code to be used for correcting positional displacement of the track 11b at which the write head 22w is located, in the track 11b at which the read head 22r is located. This enables the controller 30 to position the write head 22w at the track 11b at which data is to be written while reading the post code for correcting positional displacement of the track 11b at which data is to be written with the read head 22r in a case where the user data is written in the magnetic disk 11.

Hereinafter, in the present specification, in a case where a post code to be used for correcting positional displacement of a track #X is written in a track #Y, the track #Y will be expressed as a code track of the track #X. Further, a post code to be written in the track #Y, that is, a post code to be used for correcting positional displacement of the track #X will be expressed as a post code of the track #X.

Figure 8:
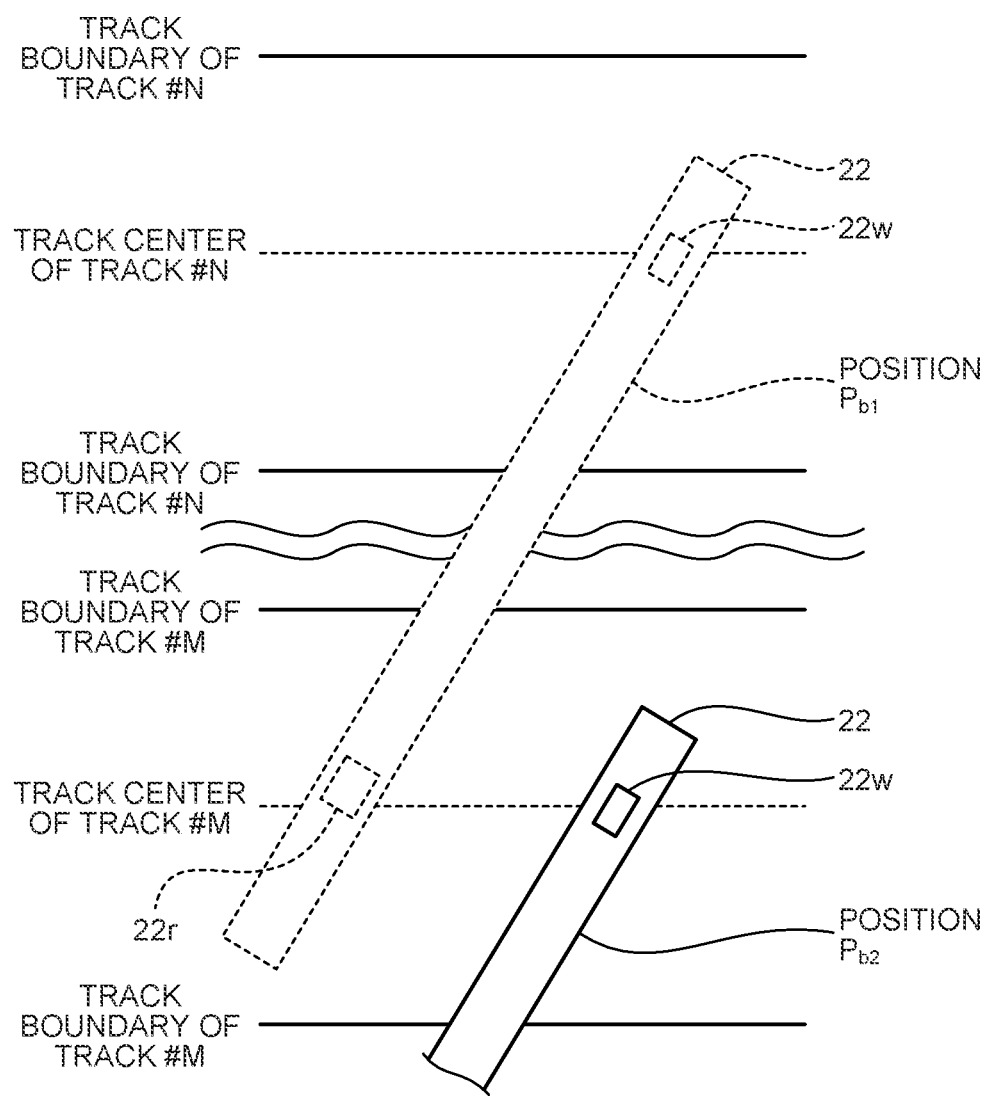
FIG. 8 is a schematic diagram for explaining positional relationship between a track and a code track of the track at the magnetic disk device in the first embodiment.

FIG. 8 is a schematic diagram for explaining positional relationship between the track 11b and a code track of the track 11b at the magnetic disk device 1 in the first embodiment. In a case where the magnetic head 22 is located at a position $P_b$, the write head 22w is located at a track center of a track #N, and the read head 22r is located near a track center of a track #M. Thus, the track #M can be set as a code track of the track #N.

In a case where the magnetic head 22 is located at a position $P_2$, the write head 22w is located at the track center of the track #M. In this event, the controller 30 writes a post code of the track #N in the track #M with the write head 22w.

As described above, in the first embodiment, the controller 30 also executes writing of the user data as part of formatting upon writing of the post code. For example, in a case where the magnetic head 22 is located at the position $P_{b2}$, the controller 30 writes the post code of the track #N in the track #M in the servo area 11a of the track #M and writes the user data in the data area 11d of the track #M.

Subsequently, operation of the magnetic disk device 1 of the first embodiment will be described.

Figure 9:
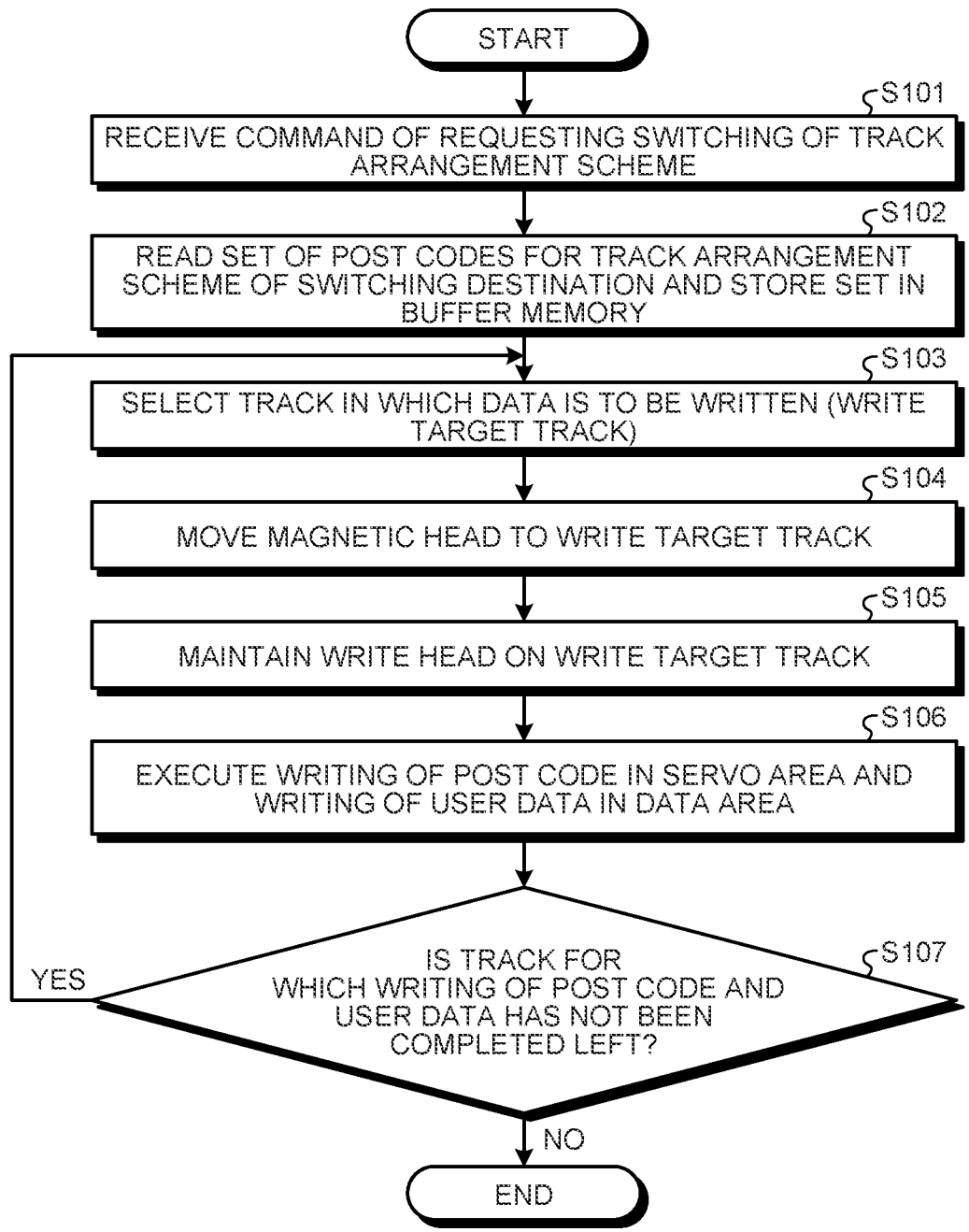
FIG. 9 is a flowchart illustrating an example of operation of the magnetic disk device in the first embodiment.

FIG. 9 is a flowchart illustrating an example of operation of the magnetic disk device 1 in the first embodiment.

First, the magnetic disk device 1 receives a command of requesting switching of the track arrangement scheme from the host 40 (3101). The controller 30 performs control of reading a set of post codes for the track arrangement scheme of the switching destination from the post code area 100 and storing the set of the post codes in the buffer memory 29 in response to the command (S102).

The command of requesting switching of the track arrangement scheme includes information indicating a range in which the track arrangement scheme is to be switched, that is, the target storage area. The command can indicate the target storage area by a position, a size or combination thereof as an example. In another example, the command can indicate the target storage area by an identifier of a band or a zone. In the processing in S102, post codes corresponding to the target storage area are read from the post code area 100 and stored in the buffer memory 29.

Note that processing from S102 to S107 which will be described later is an example of first processing in the first embodiment. In the first processing, the controller 30 executes control of reading a set of post codes from the post code area 100 and writing the read set of post codes in the target storage area (more properly, the servo areas 11a of a plurality of tracks 11b within the target storage area).

Following S102, the controller 30, selects one track 11b among all tracks 11b within the target storage area as the track 11b in which the post codes and the user data are to be written (S103). All the tracks 11b within the target storage area are all tracks 11b arranged in accordance with the track arrangement scheme of the switching destination. The controller 30 selects one track 11b from tracks 11b in which writing of the post codes and the user data has not been executed yet. The track 11b selected in S103 will be expressed as a write target track. Note that the write target track is an example of a first track.

Subsequently, the controller 30 executes seek control of moving the magnetic head 22 to the write target track (S104). Then, the controller 30 executes tracking control of maintaining the write head 22w on the write target track (S105). In this tracking control, the controller 30 can use a post code of the write target track among the set of post codes stored in the buffer memory 29.

Note that in a case where the post code of the write target track has been written in a code track of the write target track at a time point of the processing in S105, the controller 30 may acquire the post code from the code track with the read head 22r and use the acquired post code in tracking control.

The controller 30 executes control of writing the post code in the servo area 11a and writing the user data in the data area 11d as part of formatting under tracking control (S106). The post code written in the processing in S106 is a post code of the track 11b which is a code track of the write target track. The controller 30 executes writing of the post code in a case where the write head 22w passes through the servo area 11a of the write target track and executes writing of the user data in a case where the write head 22w passes through the data area 11d of the write target track. The controller 30 writes the post codes in all the servo areas 11a of the write target track and writes the user data in all the data areas 11d of the write target track.

Note that processing of writing the post code in the servo area 11a among the processing in S106 is an example of a second processing in the first embodiment. Processing of writing the user data in the data area 11d among the processing in S106 is an example of a third processing in the first embodiment.

After writing of the post code and the user data in the write target track is completed, the controller 30 determines whether or not a track for which writing of the post code and the user data has not been completed is left in the target storage area (S107).

In a case where a track for which writing of the post code and the user data has not been completed is left (S107: Yes), the control transitions to S103. In a case where a track for which writing of the post code and the user data has not been completed is not left (S107: No), operation of the first embodiment is finished.

In this manner, in the first embodiment, the controller 30 executes the first processing of reading a set of post codes from the post code area 100 and writing the read set of post codes in the servo areas 11a of the target storage area. In the first processing, the controller 30 executes control of executing both writing of the post codes in the servo areas 11a and writing of the user data in the data areas 11d under tracking control of maintaining the write head 22w on the write target track.

Thus, in a series of processing regarding writing of the post codes, the number of times of execution of seek control can be reduced compared to the technology according to the comparative example. This results in shortening a time period required for a series of processing of writing the post codes compared to the technology according to the comparative example. In other words, efficiency of processing regarding writing of post codes is improved.

Second Embodiment

In the first embodiment, the post code is written upon writing of the user data as part of formatting. A timing of writing of the post code is not limited to this.

In a second embodiment, the post code is written when the magnetic disk 11 is accessed to write or read the user data in response to the access command from the host 40. The second embodiment will be described below.

In a case where the post code is written along with reading of the user data in response to the access command under tracking control, it is necessary to satisfy a condition that the write head 22w is located on the write target track in a state where the read head 22r is located on a track (read target track) from which data is to be read. This condition will be expressed as a write permission condition.

Figure 10:
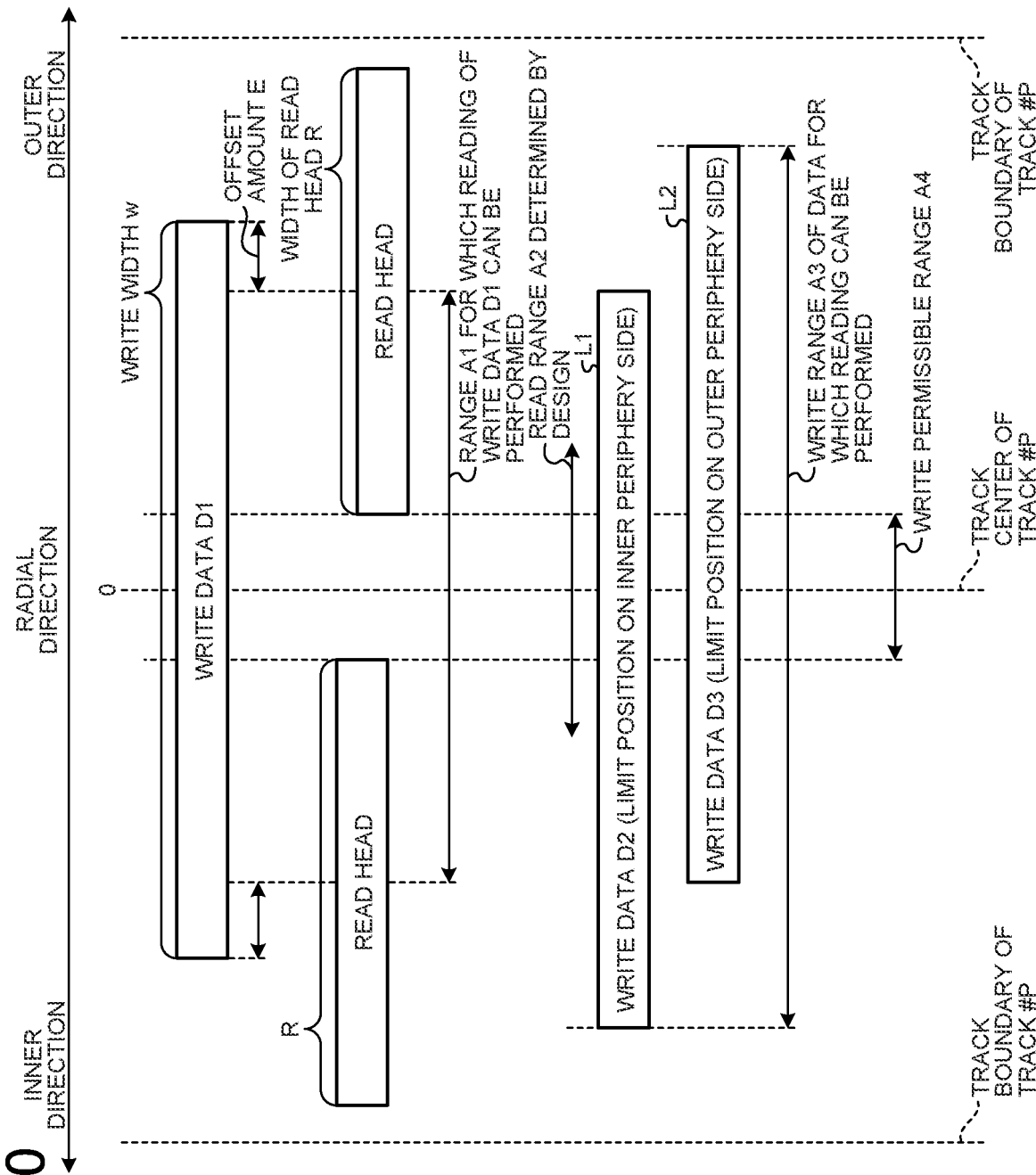
FIG. 10 is a schematic diagram for explaining details of a write permission condition of a second embodiment.

FIG. 10 is a schematic diagram for explaining details of the write permission condition of the second embodiment. In FIG. 10, a radial position of a track center of a certain track #P is assumed as an origin for convenience sake, and an outer direction is assumed as a positive direction.

For example, in a case where data (expressed as write data D1) is written in a track center of a track #P by the write head 22w, a width of a range in which the write data D1 is written is W. In a case where this write data D1 is tried to be read by the read head 22r, a center of the read head 22r requires to be located in a range A1 obtained by offsetting right and left end portions of the range in which the write data D1 is written by a predetermined offset amount E. In other words, the range A1 is a range for which reading of the write data D1 can be performed. In a case where a position CR of the read head 22r satisfies the following expression (1), the write data D can be read.

$$(W/2-E) \le CR \le (W/2-E) \quad (1)$$

In contrast, a range A2 in which reading is performed using the read head 22r is determined by design. The range A2 is narrower than the range A1. Data requires to fall within a range A3 from—$(W-A2/2-R/2+E)$ to $(W-A2/2-R/2+E)$ to enable the read head 22r at the position CR in a range from $-A2/2$ to $A2/2$ to read data. L1 indicated in FIG. 10 indicates a write range of data (expressed as write data D2) written at a position closest to the inner periphery side within the range A3. L2 indicated in FIG. 10 indicates a write range of data (expressed as write data D3) written at a position closest to the outer periphery side within the range A3.

A position CW of the write head 22w requires to satisfy the following expressions (2) so that the write range of the data falls within the range A3 in this manner.

$$(W/2-A2/2-R/2+E) \le CW,$$
$$CW \le (W/2-A2/2-R/2+E) \quad (2)$$

A possible range of the CW will be expressed as a write permissible range. In the example illustrated in FIG. 12, A4 indicates the write permissible range. The controller 30 can execute both reading of the user data and writing of the post code under tracking control in a case where write head 22w is located in the write permissible range of the write target track in a state where the read head 22r is located on the read target track. The controller 30 executes reading of the user data under tracking control, but does not execute writing of the post code in a case where the position of the write head 22w deviates from the write permissible range based on a track center of the write target track in a state where the read head 22r is located on the read target track.

Figure 11:
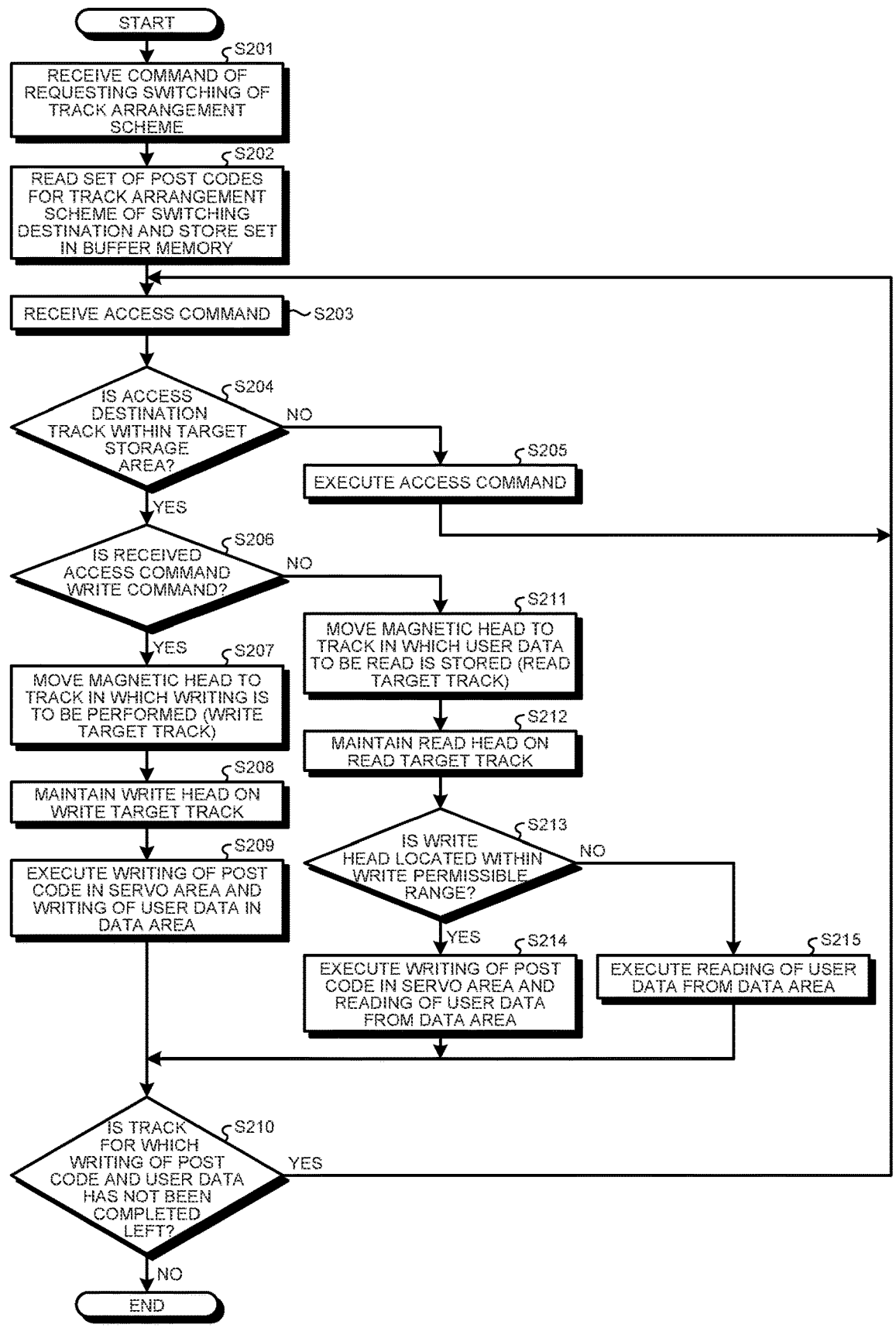
FIG. 11 is a flowchart illustrating an example of operation of the magnetic disk device in the second embodiment.

FIG. 11 is a flowchart illustrating an example of operation of the magnetic disk device 1 in the second embodiment.

First, the magnetic disk device 1 receives a command of requesting switching of the track arrangement scheme from the host 40 (S201). The controller 30 performs control of reading a set of post codes for the track arrangement scheme of the switching destination from the post code area 100 and storing the set of the post codes in the buffer memory 29 in response to the command (S202).

Note that in the second embodiment, S202 to S204 and S206 to S214 correspond to one example of the first processing.

The magnetic disk device 1 can thereafter execute writing of the post code in response to receipt of the access command. Specifically, when the magnetic disk device 1 receives an access command from the host 40 (S203), the controller 30 determines whether or not an access destination corresponding to the access command is a track within the target storage area (S204). In a case where the access destination corresponding to the access command is not a track within the target storage area (S204: No), the controller 30 executes the access command (S205) and the control transitions to S203.

In a case where the access destination corresponding to the access command is a track within the target storage area (S204: Yes), the controller 30 determines whether or not the received access command is a write command (S206).

In a case where the received access command is a write command (S206: Yes), the controller 30 executes seek control of moving the magnetic head 22 to the track 11b (expressed as a write target track) in which the user data requested to be written by the write command is to be written (S207). Then, the controller 30 executes tracking control of maintaining the write head 22w on the write target track (S208). In this tracking control, the controller 30 can use a post code of the write target track among the set of post codes stored in the buffer memory 29.

Note that in a case where the post code of the write target track has been written in a code track of the write target track at a time point of the processing in S208, the controller 30 may acquire the post code from the code track with the read head 22r and use the acquired post code in tracking control.

The controller 30 executes control of writing the post code in the servo area 11a and writing the user data in the data area 11d according to the write command, under tracking control (S209). The post code written in the processing in S209 is a post code of the track 11b which is a code track of the write target track. The controller 30 executes writing of the post code in a case where the write head 22w passes through the servo area 11a of the write target track and executes writing of the user data in a case where the write head 22w passes through the data area 11d of the write target track. The controller 30 writes the post code in all of the servo area 11a of the write target track. The controller 30 writes the user data requested to be written by the write command in the data area 11d of the write target track.

Note that in a case where the post code has already been written in the write target track, the controller 30 may execute control of executing writing of the user data without writing the post code in S209. This can prevent the same post code from being written in the same track 11b many times.

Subsequently, the controller 30 determines whether or not a track for which writing of the post code and the user data has not been completed is left in the target storage area (S210). In a case where a track for which writing of the post code and the user data has not been completed is left (S210: Yes), the control transitions to S203. In a case where a track for which writing of the post code and the user data has not been completed is not left (S210: No), the controller 30 finishes a series of operation.

In a case where the received access command is not a write command (S205: No), that is, in a case where the received access command is a read command, the controller 30 executes seek control of moving the magnetic head 22 to the track 11b (expressed as a read target track) in which the user data requested to be read by the read command is stored (S211). Then, the controller 30 executes tracking control of maintaining the read head 22*r* on the read target track (S212).

The controller 30 determines whether or not the write head 22*w* is located within the write permissible range of another track 11*b* under tracking control in S212 (S213). In a case where the write head 22*w* is located within the write permissible range (S213: Yes), the controller 30 executes control of executing writing of the post code in the servo area 11*a* for the track 11*b* at which the write head 22*w* is located, and reading of the user data from the data area 11*d* of the read target track (S214). Then, the control transitions to S210.

Note that in a case where the post code has already been written in the write target track, the controller 30 may execute control of executing reading of the user data without writing the post code in S214. This can prevent the same post code from being written in the same track 11*b* many times.

In a case where the write head 22*w* is not located within the write permissible range (S213: No), the controller 30 executes control of reading the user data from the data area 11*d* of the read target track (S215). Then, the control transitions to S210.

Note that processing of writing the post code in the servo area 11*a* among the processing in S209 and processing of writing the post code in the servo area 11*a* among the processing in S214 are an example of second processing in the second embodiment. Note that processing of writing the user data in the data area 11*d* among the processing in S209 and processing of reading the user data from the data area 11*d* among S214 are an example of third processing in the second embodiment.

In this manner, according to the second embodiment, in the first processing, the controller 30 executes control of executing both writing of the post code in the servo area 11*a* and writing of the user data in the data area 11*d* or reading of the user data from the data area 11*d* under tracking control of maintaining the write head 22*w* on the write target track.

Thus, writing of the post code is executed in parallel to writing or reading of the user data, so that efficiency of processing regarding writing of the post codes is improved compared to the technology according to the comparative example.

According to the second embodiment, the magnetic disk device 1 executes characteristic operation which will be described below in accordance with the access command which is a command for writing or reading the user data. In other words, in a case where the magnetic disk device 1 receives an access command from the host 40, the controller 30 performs control to perform access to the magnetic disk 11 in accordance with the access command in a state where the magnetic head 22 is positioned with respect to the magnetic disk 11. As a result, the post code of the track 11*b* at which the write head 22*w* is located in a state where the magnetic head 22 is positioned with respect to the magnetic disk 11 is different before and after the access.

Third Embodiment

In the first embodiment and the second embodiment, the controller 30 writes the post codes read from the post code area 100 in the servo areas 11*a* of the tracks 11*b* within the target storage area. The controller 30 may perform predetermined computation processing on the post codes read from the post code area 100 and may write the post codes subjected to the computation processing in the servo areas 11*a* of the tracks 11*b* in the target storage area.

In the third embodiment, the controller 30 corrects the post codes as an example of the computation processing. Specifically, in a case where a post code of a track #U is written in a code track of the track #U, the controller 30 corrects the post code of the track #U read from the post code area 100 on the basis of an amount of positional displacement of a track #U−1 which is a track 11*b* adjacent to the track #U. The controller 30 then writes the corrected post code of the track #U in the code track of the track #U.

In recent years, an interval between the tracks 11*b* tends to be set narrower to improve recording density. Further, an interval between tracks 11*b* defined by the servo information can fluctuate in the radial direction and in the circumferential direction due to accuracy of writing of the servo information. Thus, a case may occur where two adjacent tracks 11*b* are too close to each other. In such a case, there is a case where it is difficult to read data written in a portion where the tracks are too close to each other.

The third embodiment prevents a case where it is difficult to read data due to the tracks 11*b* being too close to each other by correcting each post code on the basis of an amount of positional displacement of the adjacent track.

Hereinafter, a post code which is read from the post code area 100 and which is a post code before correction will be expressed as an original post code.

FIG. 12 is a schematic diagram for explaining processing of correction of a post code in the third embodiment. Processing of correcting the post code of the track #U will be described using FIG. 12.

The controller 30 learns an RRO of a track #U−1 as an amount of positional displacement of the track #U−1 before the post code of the track #U is written in the target storage area. Note that learning the RRO can be reworded as measuring the RRO or detecting the RRO. The controller 30 detects an actual position of the track #U−1 by the read head 22*r* and acquires the detected position as the RRO of the track #U−1.

Graph (A) of FIG. 12 shows an example of the measured position of the track #U−1, that is, the RRO of the track #U−1 obtained through learning. A horizontal axis of the graph (A) indicates a position in the circumferential direction corresponding to a lap. Note that information indicated in horizontal axes of graph (A) to (E) of FIG. 12 are in common.

The controller 30 generates a post code of the track #U−1 on the basis of the measured RRO of the track #U−1.

Graph (B) of FIG. 12 shows a post code generated on the basis of the measured RRO of the track #U−1. It can be read from the graph (B) of FIG. 12 that the post code of the track #U−1 is generated by inverting a sign of the RRO of the track #U−1. Note that a method for generating the post code of the track #U−1 is not limited to this.

The controller 30 corrects an original post code of the track #U using the generated post code of the track #U−1.

Graph (C) of FIG. 12 shows an example of the original post code of the track #U. Graph (D) of FIG. 12 shows an example of a corrected post code of the track #U. According to the examples indicated in the Graphs (B), (C) and (D) of FIG. 12, the corrected post code of the track #U can be obtained by adding the generated post code of the track #U−1 and the original post code of the track #U.

Graph (E) of Fig. shows an example of the position of the track #U in a case where positional displacement is corrected using the corrected post code of the track #U indicated in the graph (D) of FIG. 12. It can be read from the graph (E) of FIG. 12 that the actual track #U becomes close to an ideal track #U through correction based on the corrected post code of the track #U.

Note that in the example described using FIG. 12, the post code is corrected through simple addition. Computation of correction is not limited to simple addition. For example, the controller 30 can acquire the corrected post code of the track #U through weighted addition indicated in the following expression (3).

$$PC_{U\_cor}=(k*PC_{U-1}+(1-k)*PC_{U\_org})/2 \quad (3)$$

$PC_{U-1}$ represents the generated post code of the track #U−1. $PC^{U}\_org$ represents the original post code of the track #U. $PC_{U\_cor}$ represents the corrected post code of the track #U. The k is a setting value of a real number from 0 to 1.

The controller 30 can execute learning of the RRO (RRO of the track #U−1 in the example in FIG. 12) to be used for correction at any timing.

In an example, the controller 30 may execute seek control and tracking control only for the purpose of learning the RRO. For example, in the example in FIG. 12, the magnetic head 22 may be moved to the track #U−1 and the read head 22*r* may be maintained on the track #U−1 only for the purpose of learning the RRO of the track #U−1.

In another example, the controller 30 may execute learning of the RRO in parallel to writing of the user data or the post code in a case where the read head 22*r* is located on a learning target track 11*b* upon writing of the user data or the post code.

FIG. 13 is a view for explaining a condition for executing learning of an RRO in parallel to writing at a magnetic disk device 1 in the third embodiment. This condition will be expressed as a learning permission condition.

In the example illustrated in FIG. 13, tracking control of the magnetic head 22 is executed so that the write head 22*w* is located at a track center of the track #Q to write the post code or the user data in the track #Q. In a case where the write head 22*w* is located at the track center of the track #Q, the read head 22*r* is located on a track #R which is different from the track #Q. In this event, if the read head 22*r* is located within the write permissible range, the controller 30 can learn the RRO of the track #R. In other words, the learning permission condition is a condition that the read head 22*r* is located within the write permissible range of the learning target track 11*b*.

For example, the controller 30 can execute learning of the RRO in parallel to writing of the user data or the post code in a case where the read head 22*r* is located within the write permissible range of any track 11*b* within the target storage area upon writing of the user data or the post code. The controller 30 does not execute learning of the RRO in parallel to writing of the user data or the post code in a case where the read head 22*r* is not located within the write permissible range of any track 11*b* within the target storage area upon writing of the user data or the post codes.

FIG. 14 is a flowchart illustrating an example of operation of the magnetic disk device 1 in the third embodiment. Here, operation of writing a post code of one track #S will be described.

First, the controller 30 executes learning of an RRO of a track #S−1 using the read head 22*r* (S301).

In a case where the third embodiment is used in combination with the first embodiment, the controller 30 can execute processing in S301 at any timing in the first processing described using FIG. 9.

The post code to be written in the write target track is a post code of a track having the write target track as a code track and can be a post code of the track #S in description of FIG. 14. The controller 30 may execute the processing in S301 using a track adjacent to the track having the write target track as the code track, as a learning target in a case where the write target track is selected through the processing in S103.

Alternatively, the controller 30 may execute learning of the RROs for all tracks 11*b* within the target storage area, that is, the processing in S301. The controller 30 may store the learned RRO in the buffer memory 29 or the RAM 27 until the RRO is required for correction. The controller 30 may generate a post code through processing in S302 which will be described later on the basis of the learned RRO and may store the generated post code in the buffer memory 29, the RAM 27, or the like. The controller 30 may correct the original post code within the buffer memory 29 through processing in S303 which will be described later on the basis of the generated post code and may overwrite the original post code with the corrected post code.

Alternatively, in a case where the learning permission condition is satisfied from S105 to 106, the controller 30 may learn the RRO of the track 11*b* at which the write head 22*w* is located. The controller 30 may store the RRO obtained through learning in the buffer memory 29, the RAM 27, or the like, until the RRO is required for correction. The controller 30 may generate a post code through processing in S302 on the basis of the learned RRO and may store the generated post code in the buffer memory 29, the RAM 27, or the like. The controller 30 may correct the original post code within the buffer memory 29 through processing in S303 on the basis of the generated post code and may overwrite the original post code with the corrected post code.

In a case where the third embodiment is used in combination with the second embodiment, the controller 30 can execute processing in S301 at any timing in the first processing described using FIG. 11.

For example, the controller 30 may execute learning of the RROs for all tracks 11*b* within the target storage area, that is, the processing in S301. The controller 30 may store the learned RRO in the buffer memory 29 or the RAM 27 until the RRO is required for correction. The controller 30 may generate a post code through processing in S302 on the basis of the learned RRO and may store the generated post code in the buffer memory 29, the RAM 27, or the like. The controller 30 may correct the original post code within the buffer memory 29 through processing in S303 on the basis of the generated post code and may overwrite the original post code with the corrected post code.

Alternatively, in a case where the learning permission condition is satisfied from S208 to S209, the controller 30 may learn the RRO of the track 11*b* at which the write head 22*w* is located. The controller 30 may store the RRO obtained through learning in the buffer memory 29, the RAM 27, or the like, until the RRO is required for correction. The controller 30 may generate a post code through processing in S302 on the basis of the learned RRO and may store the generated post code in the buffer memory 29, the RAM 27, or the like. The controller 30 may correct the original post code within the buffer memory 29 through processing in S303 on the basis of the generated post code and may overwrite the original post code with the corrected post code.

Following S301, the controller 30 generates a post code of a track #S−1 on the basis of the learned RRO of the track #S−1 (S302).

The controller 30 corrects an original post code of the track #S on the basis of the post code of the track #S−1 (3303).

The controller 30 then writes the corrected post code of the track #S in the servo area 11a of the code track of the track #S (S304). Then, a series of operation of the magnetic disk device 1 of the third embodiment is finished.

In a case where the third embodiment is performed in combination with the first embodiment, the processing in S304 is executed in S106 among a series of operation illustrated in FIG. 9. In a case where the third embodiment is performed in combination with the second embodiment, the processing in S304 is executed in S209 or S214 among a series of operation illustrated in FIG. 11.

In this manner, in the third embodiment, the controller 30 acquires an amount of positional displacement of the adjacent track and corrects the post code on the basis of the acquired amount of the positional displacement in the first processing. The controller 30 then writes the corrected post code in the servo area 11a of the write target track.

It is therefore possible to prevent a state where it is difficult to read data due to the tracks 11b being too close to each other.

Note that there is a case where the magnetic disk device 1 is influenced by a temperature or vibration upon writing of the post code. The influence can differ for each magnetic disk device 1. Further, there is a case where positions of the tracks 11b fluctuate, and the tracks 11b becomes too close to each other by the influence.

In the third embodiment, the magnetic disk device 1 having the configuration as described above can prevent the tracks 11b from being too close to each other due to influence of a temperature or vibration.

Further, according to the third embodiment, the controller 30 generates a post code of an adjacent track on the basis of the acquired amount of the positional displacement of the adjacent track and corrects a post code to be written in the write target track on the basis of the post code of the adjacent track.

More specifically, in an example, the controller 30 corrects the post code to be written in the write target track through weighted addition of the post code to be written in the write target track and the post code of the adjacent track.

In the first to the third embodiments, the controller 30 executes the first processing by being triggered by reception of a command of requesting switching of the track arrangement scheme. The first processing is executed not only by being triggered by reception of a command of requesting switching of the track arrangement scheme. The controller 30 may execute the first processing by being triggered by any event.

As described in the first to third embodiments, the controller 30 executes the first processing of reading a set of post codes from the post code area 100 and writing the read set of post codes in the servo areas 11a of the target storage area. In the first processing, the controller 30 executes control of executing both writing of the post code in the servo area 11a and writing of the user data in the data area 11d or reading of the user data from the data area 11d under tracking control of maintaining the write head 22w on the write target track.

Thus, efficiency of processing regarding writing of post codes is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk in which a first storage area and a second storage area in which a plurality of tracks are set are provided in a radial direction, a plurality of post codes for correcting positional displacement of the plurality of tracks being stored in the first storage area, a third storage area and a fourth storage area being provided in a circumferential direction in the second storage area;
a magnetic head including a write head that executes writing to the magnetic disk and a read head that executes reading from the magnetic disk; and
a controller that executes control of executing first processing of reading the plurality of post codes from the first storage area and writing the plurality of read post codes in the third storage area of the second storage area, and executes, in the first processing, in a state where the write head is located on a first track among the plurality of tracks, control of executing both second processing of writing a first post code among the plurality of read post codes in the third storage area and third processing of writing user data in the fourth storage area or reading user data from the fourth storage area.

2. The magnetic disk device according to claim 1, wherein the first post code is a post code for correcting positional displacement of a second track, and
the second track is a track at which the write head is located in a state where the read head is located on the first track.

3. The magnetic disk device according to claim 2,
wherein the controller executes control of:
in the first processing, acquiring an amount of positional displacement of a third track adjacent to the second track among the plurality of tracks and correcting the first post code on a basis of the amount of the positional displacement of the third track; and
in the second processing, writing of the corrected first post code.

4. The magnetic disk device according to claim 3,
wherein the controller
generates a second post code for correcting the positional displacement of the third track on a basis of the acquired amount of the positional displacement of the third track, and
corrects the first post code through weighted addition of the first post code and the generated second post code.

5. The magnetic disk device according to claim 1, wherein the controller is configured to arrange the plurality of tracks in accordance with a first scheme, and be capable of switching the first scheme between two second schemes,
the plurality of post codes includes two sets of post codes, each of the two sets corresponding to a respective second scheme among the two second schemes, and
the controller, in the first processing, executes control of reading a set which corresponds to a second scheme to which the first scheme is switched among the two sets from the first storage area and writing post codes included in the read set in the third storage area of the second storage area.

6. The magnetic disk device according to claim 2,
wherein the controller is configured to arrange the plurality of tracks in accordance with a first scheme, and be capable of switching the first scheme between two second schemes,
the plurality of post codes includes two sets of post codes, each of the two sets corresponding to a respective second scheme among the two second schemes, and
the controller, in the first processing, executes control of reading a set which corresponds to a second scheme to which the first scheme is switched among the two sets from the first storage area and writing post codes included in the read set in the third storage area of the second storage area.

7. The magnetic disk device according to claim 3,
wherein the controller is configured to arrange the plurality of tracks in accordance with a first scheme, and be capable of switching the first scheme between two second schemes,
the plurality of post codes includes two sets of post codes, each of the two sets corresponding to a respective second scheme among the two second schemes, and
the controller, in the first processing, executes control of reading a set which corresponds to a second scheme to which the first scheme is switched among the two sets from the first storage area and writing post codes included in the read set in the third storage area of the second storage area.

8. The magnetic disk device according to claim 4,
wherein the controller is configured to arrange the plurality of tracks in accordance with a first scheme, and be capable of switching the first scheme between two second schemes,
the plurality of post codes includes two sets of post codes, each of the two sets corresponding to a respective second scheme among the two second schemes, and
the controller, in the first processing, executes control of reading a set which corresponds to a second scheme to which the first scheme is switched among the two sets from the first storage area and writing post codes included in the read set in the third storage area of the second storage area.

9. The magnetic disk device according to claim 5,
wherein one of the two second schemes is a scheme in which the plurality of tracks is arranged so that data is written in a manner such that data of one track between two tracks which are adjacent to each other in a radial direction of the magnetic disk overlaps with part of data of the other track between the two tracks, and
the other of the two second schemes is a scheme in which the plurality of tracks is arranged so that data of two tracks which are adjacent to each other in the radial direction of the magnetic disk do not overlap with each other.

10. The magnetic disk device according to claim 6,
wherein one of the two second schemes is a scheme in which the plurality of tracks is arranged so that data is written in a manner such that data of one track between two tracks which are adjacent to each other in a radial direction of the magnetic disk overlaps with part of data of the other track between the two tracks, and
the other of the two second schemes is a scheme in which the plurality of tracks is arranged so that data of two tracks which are adjacent to each other in the radial direction of the magnetic disk do not overlap with each other.

11. The magnetic disk device according to claim 7,
wherein one of the two second schemes is a scheme in which the plurality of tracks is arranged so that data is written in a manner such that data of one track between two tracks which are adjacent to each other in a radial direction of the magnetic disk overlaps with part of data of the other track between the two tracks, and
the other of the two second schemes is a scheme in which the plurality of tracks is arranged so that data of two tracks which are adjacent to each other in the radial direction of the magnetic disk do not overlap with each other.

12. The magnetic disk device according to claim 8,
wherein one of the two second schemes is a scheme in which the plurality of tracks is arranged so that data is written in a manner such that data of one track between two tracks which are adjacent to each other in a radial direction of the magnetic disk overlaps with part of data of the other track between the two tracks, and
the other of the two second schemes is a scheme in which the plurality of tracks is arranged so that data of two tracks which are adjacent to each other in the radial direction of the magnetic disk do not overlap with each other.

13. A magnetic disk device comprising:
a magnetic disk including a first storage area in which a plurality of tracks is arranged in a radial direction, a second storage area and a third storage area being provided in a circumferential direction in the first storage area, a plurality of post codes for correcting positional displacement of the plurality of tracks being stored in the second storage area;
a magnetic head including a write head that executes writing to the magnetic disk and a read head that executes reading from the magnetic disk; and
a controller that executes, in a first state in which the magnetic head is positioned, control of executing access to the third storage area on a track among the plurality of tracks in accordance with a write command or a read command from a host, and
during executing the access in the first state, control of executing overwriting of a post code among the plurality of post codes at the second storage area on a track at which the write head is located in the first state among the plurality of tracks.

14. A method for controlling a magnetic disk device including: a magnetic disk in which a first storage area and a second storage area in which a plurality of tracks is set are provided in a radial direction, a plurality of post codes for correcting positional displacement of the plurality of tracks being stored in the first storage area, a third storage area and a fourth storage area being provided in a circumferential direction in the second storage area; and a magnetic head including a write head that executes writing to the magnetic disk and a read head that executes reading from the magnetic disk, the method comprising:
reading the plurality of post codes from the first storage area; and
executing first processing of writing the plurality of read post codes in the third storage area of the second storage area,
wherein the executing the first processing includes executing, in a state where the write head is located on a first track among the plurality of tracks, both second processing of writing a first post code among the plurality of read post codes in the third storage area and third processing of writing user data in the fourth storage area or reading user data from the fourth storage area.

15. The method according to claim 14, wherein the first post code is a post code for correcting positional displacement of a second track, and
the second track is a track at which the write head is located in a state where the read head is located on the first track.

16. The method according to claim 15, wherein the executing the first processing includes acquiring an amount of positional displacement of a third track adjacent to the second track among the plurality of tracks and correcting the first post code on a basis of the amount of the positional displacement the third track, and
the second processing includes writing the corrected first post code.

17. The method according to claim 16, further comprising:
generating a second post code for correcting the positional displacement of the third track on a basis of the acquired amount of the positional displacement of the third track; and
correcting the first post code through weighted addition of the first post code and the generated second post code.

18. The method according to claim 14 further comprising:
arranging the plurality of tracks in accordance with a first scheme; and
switching the first scheme between two second schemes, wherein
the plurality of post codes includes two sets of post codes, each of the two sets corresponding to a respective second schemes among the two second schemes, and
the executing the first processing includes
reading a set which correspond to a second scheme to which the first scheme is switched among the two sets from the first storage area and writing post codes included in the read set in the third storage area of the second storage area.

19. The method according to claim 15 further comprising:
arranging the plurality of tracks in accordance with a first scheme; and
switching the first scheme between two second schemes, wherein
the plurality of post codes includes two sets of post codes, each of the two sets corresponding to a respective second schemes among the two second schemes, and
the executing the first processing includes
reading a set which correspond to a second scheme to which the first scheme is switched among the two sets from the first storage area and writing post codes included in the read set in the third storage area of the second storage area.

20. The method according to claim 18, wherein one of the two second schemes is a scheme in which the plurality of tracks is arranged so that data is written in a manner such that data of one track between two tracks which are adjacent to each other in a radial direction of the magnetic disk overlaps with part of data of the other track between the two tracks, and
the other of the two second schemes is a scheme in which the plurality of tracks is arranged so that data of two tracks which are adjacent to each other in the radial direction of the magnetic disk do not overlap with each other.

* * * * *